(12) United States Patent
Zaizen et al.

(10) Patent No.: US 11,525,169 B2
(45) Date of Patent: *Dec. 13, 2022

(54) NON-ORIENTED ELECTRICAL STEEL SHEET AND METHOD FOR PRODUCING SAME, AND MOTOR CORE AND METHOD FOR PRODUCING SAME

(71) Applicant: JFE STEEL CORPORATION, Tokyo (JP)

(72) Inventors: Yoshiaki Zaizen, Tokyo (JP); Tomoyuki Okubo, Tokyo (JP); Yoshihiko Oda, Tokyo (JP); Yukino Miyamoto, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/281,617

(22) PCT Filed: Jul. 16, 2019

(86) PCT No.: PCT/JP2019/027949
§ 371 (c)(1),
(2) Date: Mar. 31, 2021

(87) PCT Pub. No.: WO2020/090160
PCT Pub. Date: May 7, 2020

(65) Prior Publication Data
US 2021/0371948 A1   Dec. 2, 2021

(30) Foreign Application Priority Data

Oct. 31, 2018   (JP) .............................. JP2018-204956

(51) Int. Cl.
*C21D 9/46* (2006.01)
*B32B 15/01* (2006.01)
(Continued)

(52) U.S. Cl.
CPC .............. *C21D 9/46* (2013.01); *B32B 15/011* (2013.01); *C21D 6/008* (2013.01); *C21D 8/1222* (2013.01);
(Continued)

(58) Field of Classification Search
CPC ....................................................... C21D 9/46
See application file for complete search history.

(56) References Cited

U.S. PATENT DOCUMENTS 11,136,645 B2 * 10/2021 Zaizen .................... C22C 38/60
2014/0366988 A1   12/2014 Dorninger et al.
(Continued)

FOREIGN PATENT DOCUMENTS

CN   103498096 A   1/2014
CN   105950960 A   9/2016
(Continued)

OTHER PUBLICATIONS

Oct. 8, 2019 International Search Report issued in International Patent Application No. PCT/JP2019/027949.
(Continued)

*Primary Examiner* — Jophy S. Koshy
(74) *Attorney, Agent, or Firm* — Oliff PLC

(57) ABSTRACT

A non-oriented electrical steel sheet with an average magnetostriction $\lambda_{p-p}$ at 400 Hz and 1.0 T of not more than $4.5 \times 10^{-6}$, and area ratio of recrystallized grains at a section in rolling direction of steel sheet of 40 to 95% and an average grain size of 10 to 40 μm is obtained by subjecting a steel slab containing, in mass %, C: not more than 0.005%, Si: 2.8 to 6.5%, Mn: 0.05 to 2.0%, Al: not more than 3.0%, P: not more than 0.20%, S: not more than 0.005%, N: not more than 0.005%, Ti: not more than 0.003%, V: not more than 0.005% and Nb: not more than 0.005% and satisfying Si—2Al—Mn≥0 to hot rolling, hot-band annealing, cold (Continued)

rolling and finish annealing under adequate cold rolling and finish annealing conditions, and a motor core is manufactured by such a steel sheet.

10 Claims, 1 Drawing Sheet

(51) Int. Cl.
| | |
|---|---|
| C21D 6/00 | (2006.01) |
| C21D 8/12 | (2006.01) |
| C22C 38/00 | (2006.01) |
| C22C 38/02 | (2006.01) |
| C22C 38/04 | (2006.01) |
| C22C 38/06 | (2006.01) |
| C22C 38/12 | (2006.01) |
| C22C 38/14 | (2006.01) |
| C22C 38/60 | (2006.01) |
| H01F 1/147 | (2006.01) |

(52) U.S. Cl.
CPC ......... *C21D 8/1233* (2013.01); *C21D 8/1261* (2013.01); *C22C 38/001* (2013.01); *C22C 38/002* (2013.01); *C22C 38/008* (2013.01); *C22C 38/02* (2013.01); *C22C 38/04* (2013.01); *C22C 38/06* (2013.01); *C22C 38/12* (2013.01); *C22C 38/14* (2013.01); *C22C 38/60* (2013.01); *H01F 1/147* (2013.01); *C22C 2202/02* (2013.01)

(56) References Cited

U.S. PATENT DOCUMENTS

| | | |
|---|---|---|
| 2017/0260600 A1 | 9/2017 | Okubo et al. |
| 2017/0321296 A1 | 11/2017 | Hayakawa et al. |
| 2018/0066333 A1 | 3/2018 | Nakajima et al. |
| 2019/0161817 A1 | 5/2019 | Takenaka et al. |
| 2019/0382867 A1 | 12/2019 | Zaizen et al. |
| 2020/0232059 A1 | 7/2020 | Fujimura et al. |

FOREIGN PATENT DOCUMENTS

| | | |
|---|---|---|
| CN | 106574334 A | 4/2017 |
| CN | 107002162 A | 8/2017 |
| JP | S61-264131 A | 11/1986 |
| JP | H08-41603 A | 2/1996 |
| JP | H09-157744 A | 6/1997 |
| JP | 2008-50686 A | 3/2008 |
| JP | 2010-90474 A | 4/2010 |
| JP | 2011-91936 A | 5/2011 |
| JP | 2011-179027 A | 9/2011 |
| JP | 2012-136763 A | 7/2012 |
| JP | 2012-140676 A | 7/2012 |
| JP | 2016-138316 A | 8/2016 |
| JP | 2016-151050 A | 8/2016 |
| JP | 2018-21242 A | 2/2018 |
| TW | 201837200 A | 10/2018 |
| WO | 2016/017263 A1 | 2/2016 |
| WO | 2016-132753 A1 | 8/2016 |
| WO | 2018/021332 A1 | 2/2018 |
| WO | 2018/164185 A1 | 9/2018 |
| WO | 2018/179871 A1 | 10/2018 |

OTHER PUBLICATIONS

Sep. 9, 2020 Office Action issued in Japanese Patent Application No. 2019-559860.
Oct. 6, 2020 Office Action issued in Taiwanese Patent Application No. 108136965.
Oct. 13, 2021 Office Action issued in Japanese Patent Application No. 2020-174016.
Nov. 2, 2021 Office Action issued in Taiwanese Patent Application No. 109145018.
Oct. 28, 2021 Extended European Search Report issued in European Patent Application No. 19880415.5.
Feb. 15, 2022 Office Action issued in Canadian Patent Application No. 3,116,571.
Jan. 4, 2022 Office Action issued in Chinese Patent Application No. 201980070235.9.
Apr. 14, 2021 Office Action Issued in U.S. Appl. No. 16/486,121.
Paolinelli et al. "Effect of Stress Relief Annealing Temperature and Atmosphere on the Magnetic Properties of Silicon Steel". Journal of Magnetism and Magnetic Materials, vol. 304, Issue 2, pp. e599-e601. Sep. 2006.
Tada et al. "Influence of Magnetic Anisotropy on Hysteresis Loss of Non-oriented Electrical Steel Sheet". Tetsu-to-Hagané, vol. 101, No. 4, pp. 269-273, 2015.
Oct. 20, 2022 Office Action issued in Korean Patent Application No. 10-2021-7010245.

* cited by examiner

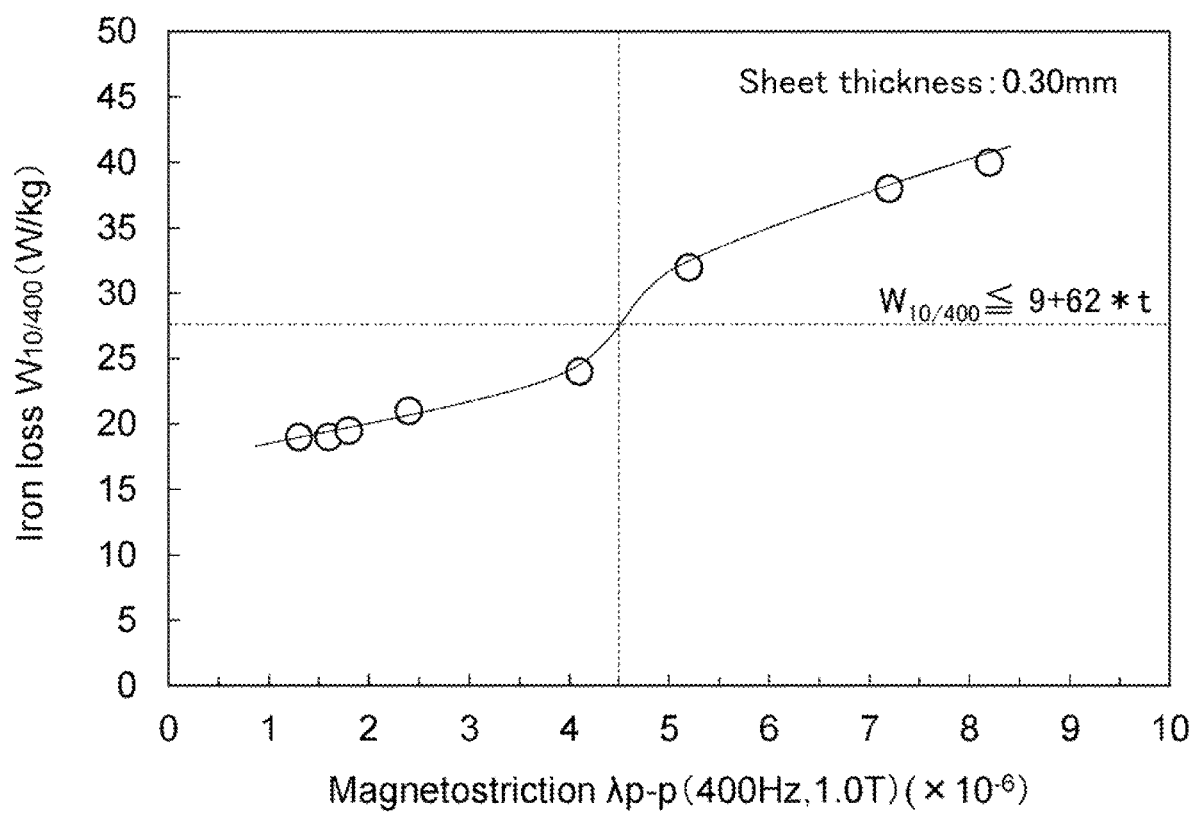

NON-ORIENTED ELECTRICAL STEEL SHEET AND METHOD FOR PRODUCING SAME, AND MOTOR CORE AND METHOD FOR PRODUCING SAME

TECHNICAL FIELD

This invention relates to a non-oriented electrical steel sheet used as an iron core material for an automotive motor and a method for producing the same as well as a motor core using the above non-oriented electrical steel sheet and a method for producing the same.

BACKGROUND ART

With the worldwide increased demand for energy saving in electric instruments in recent years, non-oriented electrical steel sheets used for an iron core of a rotary machine are required to have more excellent magnetic properties. Moreover, there has been a strong need for smaller and more powerful drive motors for HEVs (Hybrid Electric Vehicles) and EVs (Electric Vehicles), and to meet this demand, the revolution number of the motor has been increased.

A motor core comprises a stator core and a rotor core. As the driving motor for HEV has a large outer diameter, a big centrifugal force is applied to the rotor core. Also, since the rotor core has a very narrow portion (1 to 2 mm) called as a rotor core bridge portion, depending on its configuration, a non-oriented electrical steel sheet used for a rotor core is desirable to have a strength higher than that of conventional ones. On the other hand, a non-oriented electrical steel sheet used for a stator core is desirable to be a higher magnetic flux density and a lower iron loss to attain smaller and more powerful motor. That is, the ideal property of the steel sheet used for the motor core is high strength for the rotor core while it is high magnetic flux density and low iron loss for the stator core.

As described above, the electrical steel sheet used for the same motor core is required to have largely different properties between the rotor core and the stator core. In the production of the motor core, however, it is desirable to take out a rotor core material and a stator core material at the same time from the same steel sheet material by blanking, and laminate each core material to assemble the rotor core or the stator core.

As a method for producing the non-oriented electrical steel sheet with a high strength and a low iron loss as mentioned above, for example, Patent Literature 1 discloses a technique for producing a high-strength rotor core and a low-iron loss stator core from the same steel material comprising producing a non-oriented electrical steel sheet having a high strength by subjecting a steel sheet after finish annealing to skin pass rolling of not less than 3% but less than 10% and taking out a rotor core material and stator core material from the steel sheet by blanking to assemble into a rotor core and a stator core, and thereafter subjecting only the stator core to a stress relief annealing. In this technique, impurities (Ti, S, N, V, Nb, Zr and As) contained in the steel are reduced to a very low level, and further Ni is added to promote crystal grain growth in the stress relief annealing.

CITATION LIST

Patent Literature

Patent Literature 1: JP-A-2008-50686

SUMMARY OF INVENTION

Technical Problem

In the technique disclosed in Patent Literature 1, however, the skin pass rolling is performed after the finish annealing, to attain high strength and promote grain growth in the stress relief annealing, which causes a problem that the production cost is increased. Furthermore, when Ni being high in the material cost is added in a substantial amount, there is a problem that the cost becomes higher.

The invention is made in consideration of the above problems inherent to the prior art, and an object thereof is to provide a non-oriented electrical steel sheet with a high strength and a low iron loss, which can be used as an iron core material for automotive motor, a motor core using the steel sheet, and a method for producing each product at a low cost.

Solution to Problem

First, the invention that has been developed to solve the above problems and achieve the above object provides a non-oriented electrical steel sheet having a chemical composition comprising C: not more than 0.005 mass %, Si: 2.8 to 6.5 mass %, Mn: 0.05 to 2 mass %, Al: not more than 3.0 mass %, P: not more than 0.20 mass %, S: not more than 0.005 mass %, N: not more than 0.005 mass %, Ti: not more than 0.003 mass %, V: not more than 0.005 mass %, and Nb: not more than 0.005 mass %, provided that Si, Mn and Al satisfy Si—2Al—Mn≥0, and the remainder being Fe and inevitable impurities, in which an average value of magnetostriction $\lambda_{p\text{-}p}$ (L) in a rolling direction and magnetostriction $\lambda_{p\text{-}p}$ (C) in a direction perpendicular to the rolling direction at a frequency of 400 Hz and a magnetic flux density of 1.0 T is not more than $4.5 \times 10^{-6}$ and an area ratio of recrystallized crystal grains at a section in the rolling direction of the steel sheet is 40 to 95% and an average grain size is 10 to 40 μm.

The non-oriented electrical steel sheet according to the invention is preferable to contain at least one group selected from the following groups A to D, in addition to the above chemical composition:

Group A: 0.0020 to 0.10 mass % in total of one or two selected from Mo and W;

Group B: 0.005 to 0.20 mass % of one or two selected from Sn and Sb;

Group C: 0.001 to 0.010 mass % in total of one or two selected from Ca and Mg;

Group D: 0.01 to 1.0 mass % in total of one or more selected from Cu, Ni and Cr.

In the non-oriented electrical steel sheet according to the invention, it is preferable that a yield stress is not less than 500 MPa and a sheet thickness t (mm) and an iron loss $W_{10/400}$ (W/kg) satisfy the following equation (1):

$$W_{10/400} \leq 9 + 62 \times t \qquad (1).$$

Secondly, the invention proposes a method for producing a non-oriented electrical steel sheet comprising a series of steps of hot-rolling a steel slab having a chemical composition comprising C: not more than 0.005 mass %, Si: 2.8 to 6.5 mass %, Mn: 0.05 to 2.0 mass %, Al: not more than 3.0 mass %, P: not more than 0.20 mass %, S: not more than 0.005 mass %, N: not more than 0.005 mass %, Ti: not more than 0.003 mass %, V: not more than 0.005 mass %, and Nb: not more than 0.005 mass %, provided that Si, Mn and Al satisfy Si—2Al—Mn≥0, and the remainder being Fe and inevitable impurities to form a hot-rolled sheet, subjecting the hot-rolled sheet to a hot-band annealing and then to a single cold rolling or two or more cold rollings having an intermediate annealing interposed therebetween to form a cold-rolled sheet having a final sheet thickness and subjecting the cold-rolled sheet to a finish annealing, in which an average rolling speed in a final cold rolling is 100 to 900 m/min;

a friction coefficient in a final pass is 0.01 to 0.10;

a ratio ($R_s/R_t$) of rolling reduction $R_s$ in the final pass (%) to a total rolling reduction $R_t$ (%) is 0.15 to 0.45; and a soaking temperature in the finish annealing falls within the range of 700 to 820° C.

The steel slab used in the method for producing the non-oriented electrical steel sheet according to the invention is preferable to contain at least one group selected from the following groups A to D in addition to the above chemical composition:

Group A: 0.0020 to 0.10 mass % in total of one or two selected from Mo and W;

Group B: 0.005 to 0.20 mass % of one or two selected from Sn and Sb;

Group C: 0.001 to 0.010 mass % in total of one or two selected from Ca and Mg;

Group D: 0.01 to 1.0 mass % in total of one or more selected from Cu, Ni and Cr.

Thirdly, the invention provides a motor core comprising a stator core and a rotor core formed by laminating any one of the above-described non-oriented electrical steel sheets, in which an average crystal grain size of the rotor core is 10 to 40 μm and an average crystal grain size of the stator core is not less than 80 μm.

Fourthly, the invention proposes a method for producing the above motor core, in which the stator core formed by laminating the non-oriented electrical steel sheet having an average crystal grain size of 10 to 40 μm is subjected to a stress relief annealing thereby to have the average crystal grain size of not less than 80 μm.

Advantageous Effects of Invention

According to the invention, the rotor core required to have a high strength and the stator core required to have a low iron loss can be produced from the same non-oriented electrical steel sheet. Thus, it is possible to stably provide an iron core material for an automotive motor at a low cost.

BRIEF DESCRIPTION OF DRAWINGS

FIG. 1 is a graph showing a relation between magnetostriction $\lambda_{p-p}$ and iron loss $W_{10/400}$ of a steel sheet after a finish annealing.

DESCRIPTION OF EMBODIMENTS

First, there will be described an example of experiments that have led to the development of the invention.

<Experiment 1>

In order to examine an influence of magnetostriction on an iron loss $W_{10/400}$ in a high frequency band, steel slab A to H having a chemical composition shown in Table 1 are each hot rolled to form a hot-rolled sheet with a sheet thickness of 2.0 mm, and then the hot-rolled sheet is subjected to a hot-band annealing at 960° C. for 30 seconds, pickled and cold-rolled once to form a cold-rolled sheet with a final sheet thickness of 0.30 mm (total rolling reduction $R_t$: 85%). The cold-rolled sheet is then subjected to a finish annealing in a non-oxidizing atmosphere of 20 vol % $H_2$—80 vol % $N_2$ at 750° C. for 10 seconds to form a non-oriented electrical steel sheet.

Here, the cold rolling to obtain the final sheet thickness is conducted with a 5-stand tandem rolling mill under conditions that an average rolling speed in each stand is 600 m/min and a friction coefficient in the final stand is 0.03 and the rolling reduction $R_s$ in the final stand is 25% ($R_s/R_t$=0.29).

Thereafter, samples in L-direction and C-direction of a width of 30 mm and a length of 280 mm are taken out from the steel sheet after the finish annealing, and a magnetostriction $\lambda_{p-p}$ of the steel sheet after the finish annealing (frequency: 400 Hz, magnetic flux density: 1.0 T) is measured using a laser displacement gauge from the samples.

Next, an iron loss $W_{10/400}$ of each sample after the measurement of the magnetostriction is measured by an Epstein test in accordance with JIS C2550-1:2011.

Further, a JIS No. 5 tension specimen is taken out from the sample in L-direction after the measurement of the magnetostriction and subjected to a tensile test conducted in accordance with JIS Z2241:2011 to measure a yield stress (upper yield point).

Moreover, a specimen of 15 mm in L-direction and 10 mm in C-direction is taken out from the sample, and the sectional face in the rolling direction of the steel sheet (section perpendicular to the widthwise direction of the sheet) is polished, etched and then observed by an optical microscope to measure a recrystallization ratio (area ratio of recrystallized grains) and an average grain size of the recrystallized grains. The average grain size of the recrystallized grains means a diameter equivalent to a circle that is obtained by shooting a sectional area of the steel sheet (sheet thickness×1000 μm) from 3 viewing fields, measuring individual areas of the recrystallized crystal grains through image processing of the shot images and calculating an average value from the measured areas.

The measurement results are also shown in Table 1. As seen from these results, all the steel sheets after the finish annealing in this experiment have a recrystallization ratio of 75% and a microstructure where a non-recrystallization structure with an average grain size of the recrystallized crystal grains of 20 μm remains, and a yield stress of not less than 500 MPa is obtained. In the steel sheets where the value of Si—2Al—Mn is not more than 0, the magnetostriction $\lambda_{p-p}$ and iron loss $W_{10/400}$ indicate big values.

TABLE 1

| Steel symbol | Chemical composition(mass %) | | | | | | | | | | | |
|---|---|---|---|---|---|---|---|---|---|---|---|---|
| | C | P | Si | Mn | Al | S | N | O | Ti | V | Nb | Si—2Al—Mn |
| A | 0.0022 | 0.01 | 3.3 | 0.4 | 0.8 | 0.0015 | 0.0021 | 0.0021 | 0.0011 | 0.0008 | 0.0011 | 1.3 |
| B | 0.0018 | 0.01 | 3.8 | 0.5 | 0.7 | 0.0013 | 0.0019 | 0.0018 | 0.0014 | 0.0012 | 0.0013 | 1.9 |
| C | 0.0017 | 0.01 | 3.5 | 0.9 | 1.2 | 0.0018 | 0.0018 | 0.0017 | 0.0015 | 0.0011 | 0.0014 | 0.2 |

TABLE 1-continued

| | | | | | | | | | | | | |
|---|---|---|---|---|---|---|---|---|---|---|---|---|
| D | 0.0028 | 0.01 | 2.5 | 1.2 | 1.2 | 0.0019 | 0.0017 | 0.0024 | 0.0014 | 0.0012 | 0.0012 | −1.1 |
| E | 0.0024 | 0.01 | 2.8 | 1.6 | 1.5 | 0.0014 | 0.0023 | 0.0023 | 0.0012 | 0.0011 | 0.0009 | −1.8 |
| F | 0.0027 | 0.01 | 3.0 | 1.3 | 1.6 | 0.0018 | 0.0018 | 0.0029 | 0.0011 | 0.0009 | 0.0011 | −1.5 |
| G | 0.0018 | 0.01 | 4.1 | 0.2 | 0.5 | 0.0015 | 0.0019 | 0.0014 | 0.0011 | 0.0012 | 0.0008 | 2.9 |
| H | 0.0023 | 0.01 | 3.9 | 0.4 | 0.7 | 0.0017 | 0.0017 | 0.0021 | 0.0010 | 0.0011 | 0.0012 | 2.1 |

| | Steel sheet properties after finish annealing | | | | | |
|---|---|---|---|---|---|---|
| Steel symbol | Average magnetostriction value $\lambda_{p\text{-}p}$ (×10$^{-6}$) | Iron loss $W_{10/400}$ (W/kg) | Area ratio of recrystallized grains (%) | Average grain size of recrystallized grains (μm) | Yield stress (MPa) | Remarks |
| A | 2.4 | 21 | 75 | 20 | 550 | Invention Example |
| B | 1.6 | 19 | 75 | 20 | 608 | Invention Example |
| C | 4.1 | 24 | 75 | 20 | 615 | Invention Example |
| D | 5.2 | 32 | 75 | 20 | 505 | Comparative Example |
| E | 8.2 | 40 | 75 | 20 | 561 | Comparative Example |
| F | 7.2 | 38 | 75 | 20 | 586 | Comparative Example |
| G | 1.3 | 19 | 75 | 20 | 625 | Invention Example |
| H | 1.8 | 19.5 | 75 | 20 | 618 | Invention Example |

FIG. 1 also shows a relation between magnetostriction $\lambda_{p\text{-}p}$ (average value of the values in L-direction and C-direction) and iron loss $W_{10/400}$ after the finish annealing. As seen from this FIGURE, the magnetostriction $\lambda_{p\text{-}p}$ after the finish annealing is interrelated with the iron loss $W_{10/400}$, and there is a tendency that as the magnetostriction $\lambda_{p\text{-}p}$ becomes smaller, the iron loss $W_{10/400}$ decreases, and further when the magnetostriction $\lambda_{p\text{-}p}$ is not more than 4.5×10$^{-6}$, an excellent iron loss property is obtained with the iron loss $W_{10/400}$ of not more than 27.6 W/kg. This is considered due to the fact that as the magnetostriction increases, the magnetoelastic energy increases and the hysteresis loss largely increases.

<Experiment 2>

In order to further reduce the iron loss and increase the strength, the following experiment is conducted based on the above results.

A steel slab having a chemical composition comprising C: 0.0027 mass %, Si: 3.61 mass %, Mn: 0.31 mass %, P: 0.01 mass %, S: 0.0018 mass %, Al: 1.2 mass %, N: 0.0017 mass %, O: 0.0023 mass %, Ti: 0.0013 mass %, Nb: 0.0007 mass %, V: 0.0008 mass % and the remainder being Fe and inevitable impurities is hot rolled to form a hot-rolled sheet having a sheet thickness of 1.9 mm. The hot-rolled sheet is subjected to a hot-band annealing at 940° C. for 30 seconds, pickled, and cold rolled once to obtain a cold-rolled sheet having a final sheet thickness of 0.25 mm (total rolling reduction $R_t$=87%). The cold-rolled sheet is then subjected to a finish annealing in a non-oxidizing atmosphere of 20 vol % H$_2$—80 vol % N$_2$ at 790° C. for 10 seconds to obtain a non-oriented electrical steel sheet.

Thereafter, samples in L-direction and C-direction of a width of 30 mm and a length of 280 mm are taken out from a widthwise central portion of the steel sheet after the finish annealing (every 100 m in the coil), and an iron loss $W_{10/400}$ of the steel sheet after the finish annealing is measured in accordance with JIS C2550-1:2011.

Moreover, a JIS No. 5 tension specimen is taken out from the sample in L-direction after the measurement of the iron loss and subjected to a tensile test thereof in accordance with according to JIS Z2241:2011 to measure a yield stress YS (upper yield point).

The measurement result shows that there is large variation both in the iron loss and the yield stress. As a result of an examination which is made to examine the cause of the variation, it is considered that the conditions during the cold rolling (rolling speed, friction coefficient, and rolling reduction distribution) may have influenced the results.

In order to examine the influence of the conditions during the cold rolling upon the magnetostriction and iron loss after the finish annealing, a hot-rolled sheet having the same chemical composition as in the above steel slab and after hot-band annealing is used as a raw material and subjected to a final cold rolling with a 5-stand tandem rolling machine by variously changing an average rolling speed, a friction coefficient in the final pass and a ratio ($R_s/R_t$) of rolling reduction $R_s$ in final pass to total rolling reduction $R_t$ to form a cold-rolled sheet having a final sheet thickness of 0.25 mm. Thereafter, the cold-rolled sheet is subjected to a finish annealing in a non-oxidizing atmosphere of 20 vol % H$_2$—80 vol % N$_2$ at 790° C. for 10 seconds to obtain a non-oriented electrical steel sheet. Here, the friction coefficient in the final pass of the final cold rolling is adjusted by changing the rolling oil.

Then, samples are taken out from a position corresponding to each rolling condition of the steel sheet (coil) after the finish annealing, and the magnetostriction $\lambda_{p\text{-}p}$, iron loss $W_{10/400}$ and yield stress are measured as in Experiment 1, and the area ratio (recrystallization ratio) and average crystal grain size of recrystallized grains observed at a section in the rolling direction are also measured.

TABLE 2

| | Rolling conditions of final cold rolling | | | | | Steel sheet properties after finish annealing | | | | | |
|---|---|---|---|---|---|---|---|---|---|---|---|
| Steel No. | Average rolling speed (m/min) | Friction coefficient in final pass | Total rolling reduction $R_t$ (%) | Rolling reduction Rs of final pass (%) | $R_s/R_t$ | Magnetostriction average value $\lambda_{p-p}(\times 10^{-6})$ | Iron loss $W_{10/400}$ (W/kg) | Area ratio of recrystallized grains (%) | Average grain size of recrystallized grains (μm) | Yield stress (MPa) | Remarks |
| 1 | 50 | 0.02 | 86.8 | 21 | 0.24 | 8.1 | 35.0 | 35 | 25 | 570 | Comparative Example |
| 2 | 200 | 0.02 | 86.8 | 21 | 0.24 | 3.5 | 23.2 | 45 | 28 | 565 | Invention Example |
| 3 | 400 | 0.02 | 86.8 | 21 | 0.24 | 2.9 | 22.1 | 55 | 29 | 563 | Invention Example |
| 4 | 600 | 0.02 | 86.8 | 21 | 0.24 | 2.7 | 21.0 | 70 | 32 | 558 | Invention Example |
| 5 | 800 | 0.02 | 86.8 | 21 | 0.24 | 2.5 | 20.2 | 85 | 35 | 550 | Invention Example |
| 6 | 1000 | 0.02 | 86.8 | 21 | 0.24 | 2.1 | 19.5 | 98 | 55 | 480 | Comparative Example |
| 7 | 650 | 0.005 | 86.8 | 28 | 0.32 | 7.6 | 34.2 | 30 | 20 | 560 | Comparative Example |
| 8 | 650 | 0.02 | 86.8 | 28 | 0.32 | 2.5 | 20.0 | 60 | 24 | 560 | Invention Example |
| 9 | 650 | 0.08 | 86.8 | 28 | 0.32 | 2.9 | 19.3 | 70 | 28 | 554 | Invention Example |
| 10 | 650 | 0.15 | 86.8 | 28 | 0.32 | 3.9 | 20.5 | 80 | 50 | 475 | Comparative Example |
| 11 | 650 | 0.20 | 86.8 | 28 | 0.32 | 3.7 | 20.4 | 98 | 55 | 465 | Comparative Example |
| 12 | 500 | 0.03 | 86.8 | 10 | 0.12 | 7.5 | 36.0 | 30 | 22 | 570 | Comparative Example |
| 13 | 500 | 0.03 | 86.8 | 20 | 0.23 | 2.5 | 19.5 | 55 | 25 | 555 | Invention Example |
| 14 | 500 | 0.03 | 86.8 | 30 | 0.35 | 2.6 | 19.6 | 70 | 28 | 540 | Invention Example |
| 15 | 500 | 0.03 | 86.8 | 45 | 0.52 | 3.6 | 21.1 | 98 | 50 | 470 | Comparative Example |
| 16 | 500 | 0.03 | 86.8 | 50 | 0.58 | 3.4 | 20.5 | 98 | 55 | 460 | Comparative Example |

The measurement results are also shown in Table 2. As seen from these results, as the average rolling speed is made lower, the friction coefficient in the final pass is made lower and the rolling reduction ratio in the final pass is decreased, the area ratio of the recrystallized grains decreases and the average grain size of the recrystallized grains becomes smaller and and the yield stress increases. However, when the average rolling speed is made too low, the friction coefficient in the final pass is made too low, or the rolling reduction in the final pass is extremely decreased, the magnetostriction increases rapidly and the iron loss largely increases.

From the above result, it is confirmed that the cause of the variation in the iron loss property and strength in the coil is largely influenced by the variation of the final cold rolling conditions in the coil.

The mechanism how the cold rolling conditions influence the magnetostriction properties and the area ratio and average grain size of recrystallized grains after finishing annealing is not sufficiently clear at present, but it is considered that the strain amount to be introduced and the deformation mechanism are changed by the variation of the cold rolling conditions, whereby the recrystallization behavior and the grain growth behavior in the subsequent finish annealing are changed to change the recrystallization ratio and recrystallization texture after the finish annealing, which affects the magnetostriction property and strength.

The invention is developed by further studying the above novel knowledge.

There will be described the properties of the non-oriented electrical steel sheet according to the invention below.

Yield stress: not less than 500 MPa

A rotor core is generally produced by shaping a steel sheet after finish annealing into a core by blanking or the like, laminating, and clamping (fixing) by welding, caulking or the like, and is never subjected to a stress relief annealing. As previously described, a large centrifugal force is applied to the rotor core. Therefore, the steel sheet used for the rotor core is desirable to be high in the strength after the finish annealing also as described above. Further, the fatigue strength (fatigue limit) of the steel sheet usually becomes higher as the yield stress becomes higher. In the invention, therefore, the preferable yield stress of the steel sheet after the finish annealing is defined to be not less than 500 MPa. More preferably, it is not less than 520 MPa. Here, the yield stress is an upper yield point when a JIS No. 5 tension specimen is subjected to a tensile test in accordance with JIS Z2241:2011.

Area ratio of recrystallized grains: 40 to 95%, Average grain size of recrystallized grains: 10 to 40 μm In the non-oriented electrical steel sheet according to the invention, the yield stress after the finish annealing is desirable to be not less than 500 MPa as described above. In order to ensure the above strength in the non-oriented electrical steel sheet according to the invention, it is necessary that the area ratio of the recrystallized grains (recrystallization ratio) after the finish annealing is 40 to 95% and the average grain size of the recrystallized grains is 10 to 40 μm. When the area ratio of the recrystallized grains is less than 40% and the average grain size of the recrystallized grains is less than 10 μm, the recrystallization is insufficient and the magnetostriction becomes larger and the iron loss largely increases, as previously described. On the other hand, when the area ratio of the recrystallized grains exceeds 95% and the average grain size of the recrystallized grains exceeds 40 μm, the recrystallization is too promoted on the contrary to ensure the yield stress of not less than 500 MPa. Preferably, the area ratio of the recrystallized grains is in the range of 50 to 90%, and the average grain size of the recrystallized grains is in the range of 15 to 30 μm.

Iron loss $W_{10/400}$: not more than $9+62t$ (W/kg) (t: sheet thickness (mm))

The rotor core of the motor is preferable have a low iron loss, because heat generation causes a problem in addition to the strength. In the invention, therefore, an iron loss $W_{10/400}$ (frequency: 400 Hz, magnetic flux density B=1.0T) (W/kg) is used as an indicator of the iron loss property in accordance with the driving/controlling conditions of HEV driving motor, and the iron loss $W_{10/400}$ is defined to satisfy the following equation (1) in a relation to a product sheet thickness (final cold rolled sheet thickness) t (mm):

$$W_{10/400} \leq 9+62 \times t \qquad (1).$$

This is due to the fact that the iron loss value is dependent on the sheet thickness and, the heat generation of the motor core becomes larger and the motor efficiency considerably lowers when the iron loss value does not satisfy the above equation (1).

Magnetostriction $\lambda_{p-p}$: not more than $4.5 \times 10^{-6}$

As shown in FIG. 1, the iron loss $W_{10/400}$ of the steel sheet after the finish annealing is strongly interrelated with a magnetostriction $\lambda_{p-p}$, and hence the value of the iron loss $W_{10/400}$ after the finish annealing can be reduced by decreasing the magnetostriction $\lambda_{p-p}$ after the finish annealing. In the invention, therefore, the magnetostriction $\lambda_{p-p}$ after the finish annealing is limited to not more than $4.5 \times 10^{-6}$ where the iron loss $W_{10/400}$ satisfies the equation (1) in FIG. 1. Preferably, it is not more than $4.0 \times 10^{-6}$. Moreover, the value of the magnetostriction $\lambda_{p-p}$ is an average value of magnetostrictions $\lambda_{p-p}$ in the rolling direction (L) and the direction (C) perpendicular to the rolling direction measured at a frequency of 400 Hz and a magnetic flux density B of 1.0 T.

There will be described a chemical composition of a raw steel material (steel slab) used in a non-oriented electrical steel sheet according to the invention and a product sheet.

C: not more than 0.0050 mass %

C contained in the product sheet is a harmful element that forms a carbide to cause magnetic aging and deteriorates the iron loss property. Therefore, C contained in the raw material is limited to 0.0050 mass % as an upper limit. It is preferably not more than 0.0040 mass %. The lower limit of C is not particularly defined, but is preferable to be about 0.0001 mass % from a viewpoint of suppressing decarburization cost in the refining step.

Si: 2.8 to 6.5 mass %

Si has an effect of increasing a specific resistance of steel to reduce the iron loss and increasing a strength of steel by solid-solution strengthening. Therefore, Si is contained in an amount of not less than 2.8 mass %. On the other hand, when it exceeds 6.5 mass %, it becomes difficult to perform the rolling, so that the upper limit is 6.5 mass %. Preferably, Si falls within the range of 3.0 to 6.0 mass %.

Mn: 0.05 to 2.0 mass %

Mn is an element useful for increasing the specific resistance and strength of steel, like Si, and forms a sulfide to suppress hot shortness. Therefore, Mn is contained in an amount of not less than 0.05 mass %. On the other hand, the addition of Mn exceeding 2.0 mass % causes slab cracking or the like and deteriorates operability in the steel-making step, so that the upper limit is 2.0 mass %. Preferably, it falls within the range of 0.1 to 1.5 mass %.

P: not more than 0.20 mass %

P is an element useful for adjusting the strength (hardness) of steel. However, when it exceeds 0.20 mass %, the steel causes embrittlement and it becomes difficult to perform the rolling, and therefore the upper limit is 0.20 mass %. The lower limit is not particularly defined, but it is preferable to be about 0.001 mass % from a viewpoint of suppressing the dephosphorization cost in the refining step. Preferably, P falls within the range of 0.01 to 0.1 mass %.

Al: not more than 3.0 mass %

Al is a useful element having an effect of increasing the specific resistance of steel and reducing the iron loss, like Si. However, when it exceeds 3.0 mass %, it is difficult to perform the rolling, so that the upper limit of Al is 3.0 mass %. Preferably, it is not more than 2.0 mass %.

Moreover, when the Al content is in the range of more than 0.01 mass % to less than 0.10 mass %, fine MN is precipitated to increase the iron loss, and hence Al content is preferable to be not more than 0.01 mass % or not less than 0.10 mass %. Especially, when Al is decreased, the texture is improved and the magnetic flux density increases. Therefore, when the magnetic flux density is considered important, Al is preferable to be not more than 0.01 mass %. More preferably, it is not more than 0.003 mass %.

S, N, Nb and V: not more than 0.005 mass %

S, N, Nb and V are elements that form fine precipitates, and block grain growth in stress relief annealing thereby to badly affect the iron loss property. In particular, when each element contents exceeds 0.005 mass %, the bad influence becomes remarkable. Therefore, the upper limit of each element is limited to 0.005 mass %. More preferably, it is not more than 0.003 mass %.

Ti: not more than 0.003 mass %

Ti is an element that likewise forms fine precipitates and blocks the grain growth in stress relief annealing to badly affect the iron loss property. Especially, when Ti content exceeds 0.003 mass %, the bad influence becomes remarkable. Therefore, the upper limit is limited to 0.003 mass %. Preferably, the upper limit is not more than 0.002 mass %.

In the non-oriented electrical steel sheet according to the invention, the above ingredients satisfy the composition of the above given ranges, and moreover, the contents of Si, Al and Mn (mass %) are necessary to satisfy the following equation (2):

$$Si-2Al-Mn \geq 0 \qquad (2).$$

When the above contents are out of the equation (2), i.e., the left side value of the equation (2) is less than 0, hysteresis loss after the finish annealing at a frequency of 400 Hz and a magnetic flux density B of 1.0 T increases and the magnetostriction $\lambda_{p-p}$ also increases. Moreover, the left side value of the equation (2) is preferably not less than 0.2 mass %.

Moreover, the non-oriented electrical steel sheet according to the invention may contain the following ingredients in addition to the above ingredients.

One or two selected from Mo and W: 0.0020 to 0.10 mass % in total

Mo and W are elements effective for preventing surface defects (scab) from occurring in the steel sheet. In particular, the non-oriented electrical steel sheet according to the invention is a high alloy steel, which is apt to be oxidized on its surface, and thus scabs may be caused due to surface cracking. However, the above cracking can be suppressed by adding Mo and/or W being an element increasing a high-temperature strength. This effect is insufficient when the total content of Mo and W is less than 0.0020 mass %, while when the total content exceeds 0.10 mass %, the above effect is saturated, only resulting in increase in the alloy cost. Therefore, when Mo and/or W is added, the total content of Mo and W is preferable to be in the range of 0.0020 to 0.10 mass %. More preferably, the total content is in a range of 0.0050 to 0.050 mass %.

One or two selected from Sn and Sb: 0.005 to 0.20 mass % each

Sn and Sb have an effect of improving the recrystallization texture and improving the magnetic flux density and iron loss property. In order to obtain such an effect, it is necessary to add each element in an amount of not less than 0.005 mass %. However, when the addition amount exceeds 0.20 mass %, the above effect is saturated. Therefore, when Sn and/or Sb is added, each content is preferable to be in the range of 0.005 to 0.20 mass %, more preferably, 0.01 to 0.1 mass %.

One or two selected from Ca and Mg: 0.001 to 0.010 mass % in total

Ca and Mg each have an effect of forming stable sulfide or selenide to improve the grain growth in the stress relief annealing. In order to obtain this effect, it is necessary to add Ca and/or Mg in a total amount of not less than 0.001 mass %, while when the addition amount exceeds 0.010 mass %, the iron loss rather increases. Therefore, when Ca and/or Mg are added, the total amount is preferable to fall within the range of 0.001 to 0.010 mass %. More preferably, the total amount of Ca and Mg falls within the range of 0.003 to 0.008 mass %.

One or more selected from Cu, Ni and Cr: 0.01 to 1.0 mass % in total

Cu, Ni and Cr have an effect of increasing the specific resistance of steel, reducing the iron loss and increasing the strength of steel. To obtain the above effect, it is necessary to add one or more selected from Cu, Ni and Cr in a total amount of not less than 0.01 mass %. However, the addition of not less than 1.0 mass % brings about the increase in the cost. Therefore, the total addition amount of the above elements is preferable to fall within the range of 0.01 to 1.0 mass %, more preferably 0.1 to 0.5 mass %. Further preferably, it is not less than 0.1 mass % and less than 0.5 mass %.

Next, the method for producing a non-oriented electrical steel sheet according to the invention will be described below.

The method for producing a non-oriented electrical steel sheet according to the invention comprises a series of steps of producing a raw steel material (slab) having the above chemical composition, hot rolling the slab to form a hot-rolled sheet, subjecting the hot-rolled sheet to a hot-band annealing and a single or two or more cold rollings having an intermediate annealing interposed therebetween to obtain a cold-rolled sheet having a final sheet thickness and subjecting the cold-rolled sheet to a finish annealing. This method will be concretely described below.

At first, the steel slab used in the production of a non-oriented electrical steel sheet according to the invention can be produced by melting a steel having a chemical composition adapted to the invention by a known refining process using a converter, an electric furnace, a vacuum degassing device or the like and then conducting a usual continuous casting method or an ingot making—blooming method. Moreover, a thin cast slab having a thickness of not more than 100 mm may be produced by a direct casting method.

Then, the steel slab is hot rolled by a known method to form a hot-rolled sheet. The steel slab is usually subjected to the hot rolling after reheating to a given temperature in a heating furnace, but may be subjected to the hot rolling immediately after casting without reheating. When the thin cast slab is used, it may be subjected to hot rolling or may be put forward to the subsequent step without hot rolling.

In the hot-band annealing subsequent to the hot rolling, the soaking temperature is preferably in the range of 800 to 1100° C. When it is lower than 800° C., the effect of the hot-band annealing is small and the effect of improving the magnetic properties cannot be obtained sufficiently, while when it exceeds 1100° C., the crystal grains may be coarsened to promote brittle fracture (sheet breakage) in the cold rolling or it may become disadvantageous in the production cost. Moreover, a soaking time is preferable to be not more than 3 minutes from a viewpoint of ensuring the productivity. More preferably, the soaking temperature is 850 to 1000° C., and the soaking time is not more than 1 minute.

Thereafter, the hot-rolled sheet after the hot-band annealing is pickled and subjected to a single cold rolling or two or more cold rollings having an intermediate annealing interposed therebetween to obtain a cold-rolled sheet with a final sheet thickness. In this case, it is important to adjust an average rolling speed in the final cold rolling to obtain the final sheet thickness, a friction coefficient in the final pass and a ratio ($R_s/R_t$) of rolling reduction in the final pass to total rolling reduction to respective given ranges that will described later, from a viewpoint of achieving both the iron loss and strength, as previously described. Moreover, the final sheet thickness (product sheet thickness) is preferable to be in the range of 0.1 to 0.35 mm. The productivity decreases when the final sheet thickness exceeds 0.35 mm, while the effect of reducing the iron loss is small when it is less than 0.1 mm.

The average rolling speed in the final cold rolling is necessary to be in the range of 100 to 900 m/min. As previously described, when the average rolling speed in the final cold rolling is less than 100 m/min, the magnetostriction increases and the iron loss largely increases. While when the average rolling speed exceeds 900 m/min, the crystal grain size of the recrystallized grains becomes larger and the strength decreases. The preferable average rolling speed falls within the range of 200 to 800 m/min.

Here, the average rolling speed means the average rolling speed of 1 to n-passes when the final cold rolling is performed at n passes using a Sendzimir mill, and the average rolling speed of 1 to n-stands when a n-stand tandem rolling machine is used.

The friction coefficient of the final pass in the final cold rolling is necessary to fall within the range of 0.01 to 0.10. As previously described, when the friction coefficient of the final pass is less than 0.01, the magnetostriction increases and the iron loss largely increases. When it exceeds 0.10, the average grain size of the recrystallized grains becomes larger and the strength is decreased. Preferably, the friction coefficient of the final pass falls within the range of 0.02 to 0.08.

The friction coefficient can be determined from the sheet thickness, tension, rolling load, deformation resistance and the like by a Bland & Ford formula. Also, the friction coefficient can be adjusted by changing the rolling oil, adjusting roughness in the rolling roll or the like.

Further, the ratio ($R_s/R_t$) of rolling reduction $R_s$ in the final pass to total rolling reduction $R_t$ in the final cold rolling is necessary to be controlled to in the range of 0.15 to 0.45. As previously described, when $R_s/R_t$ is less than 0.15, the magnetostriction becomes larger and the iron loss also increases. When $R_s/R_t$ exceeds 0.45, on the other hand, the average grain size of the recrystallized grains increases to decrease the strength. The preferable $R_s/R_t$ is in the range of 0.20 to 0.40.

Next, the cold-rolled sheet having the final sheet thickness is subjected to a finish annealing. The finish annealing is preferably a continuous annealing at an annealing temperature (soaking temperature) of 700 to 820° C. When the soaking temperature is lower than 700° C., the recrystallization is insufficient, so that the area ratio of the recrystallized grains of not less than 40% and the average grain size of not less than 10 μm cannot be attained and the good magnetic properties cannot be obtained. In addition to that, the effect of correcting the shape in the continuous annealing is not obtained sufficiently. When the soaking temperature exceeds 820° C., on the other hand, the recrystallization is rather promoted excessively to cause the area ratio of the recrystallized grains to exceed 95% and coarsen the crystal grain size to be more than 40 μm, resulting that the yield stress of not less than 500 MPa cannot be ensured after the finish annealing. Also, the soaking time is preferable to be in the range of 1 to 300 seconds. Moreover, the finish annealing conditions are lower temperature and shorter time as much as possible within a range capable of correcting the shape from a viewpoint of ensuring the strength after the finish annealing required in the rotor core. Concretely, the conditions are preferable to be on the range of 720 to 800° C. and 1 to 20 seconds.

Thereafter, it is preferable to apply an insulation coating to the surface of the steel sheet after the finish annealing to obtain the insulation property in the lamination. An organic coating containing a resin is preferable to be selected as the insulation coating in order to obtain a good blanking property, while a semi-organic or inorganic coating is preferable to be selected when the weldability is considered important.

When a material having an area ratio of recrystallized grains of not more than 95% and a crystal grain size of not more than 40 μm is used for the stator core of the motor, there is caused a problem that the iron loss is increased and the motor efficiency is lowered. Against such a problem, for example, when the iron loss ratio of the rotor core is small and the iron loss of the stator core is dominant with respect to the iron loss of the entire motor as in a core of permanent magnet type motor such as SPM, IPM or the like used in a power source of a hybrid vehicle (HEV), it is effective, in the rotor core, to ensure the strength with the recrystallization ratio and crystal grain size kept small, while, in the stator core, it is effective to perform a stress relief annealing after assembly of the core to increase the crystal grain size and reduce the iron loss. In order to obtain such an effect of reducing the iron loss, it is preferable that the area ratio of the recrystallized grains is 100% and the average grain size is not less than 80 μm after the stress relief annealing. The average grain size is more preferably not less than 90 μm, further preferably not less than 100 μm. Moreover, the stress relief annealing can be conducted under usual conditions, that for example, a soaking temperature is 700 to 950° C. and a soaking time is 10 to 300 minutes.

EXAMPLES

Steel slabs A to BC having different chemical compositions shown in Tables 3-1 and 3-2 are each heated at 1100° C. for 30 minutes and hot rolled to form a hot-rolled sheet having a sheet thickness of 2.0 mm. The hot-rolled sheet is subjected to a hot-band annealing at 980° C. for 30 seconds, cold rolled once, and rolled under conditions shown in Tables 4-1 and 4-2 using a 4 stand tandem rolling machine to obtain cold-rolled sheets having various final sheet thicknesses. Thereafter, each cold rolled sheet is subjected to a finish annealing by soaking at a temperature shown in Tables 4-1 and 4-2 for 10 seconds to produce a non-oriented electrical steel sheet (product sheet).

Then, samples in L-direction and C-direction of a width of 30 mm and a length of 280 mm are taken out from the central portion in the widthwise direction of the product sheet to measure an average magnetostriction $\lambda_{p-p}$ in L-direction and C-direction using a laser displacement gauge and an iron loss $W_{10/400}$ by an Epstein test. Also, JIS No. 5 tension specimen is taken out from the L-direction sample after the measurement of the magnetostriction and iron loss, and a tensile test thereof is conducted according to JIS Z2241:2011 to measure a yield stress (upper yield point). Further, a sample of 15 mm×10 mm is taken out from the above L-direction sample, and a section texture in the rolling direction thereof is observed to measure an area ratio (recrystallization ratio) of the recrystallized grains after the finish annealing and an average grain size of the recrystallized grains.

The measurement results are also shown in Tables 4-1 and 4-2. As seen from these results, all of the steel sheets after the finish annealing produced from the raw steel material having the chemical composition adapted to the invention under the conditions adapted to the invention have a yield stress of not less than 500 MPa and are excellent in the iron loss property.

TABLE 3-1

| Steel symbol | Chemical composition (mass %) | | | | | | | | | |
|---|---|---|---|---|---|---|---|---|---|---|
| | C | P | Si | Mn | Al | S | N | O | Ti | Nb |
| A | 0.0022 | 0.01 | 3.5 | 0.40 | 0.90 | 0.0015 | 0.0024 | 0.0017 | 0.0013 | 0.0016 |
| B | 0.0018 | 0.01 | 3.7 | 0.40 | 0.60 | 0.0019 | 0.0024 | 0.0014 | 0.0009 | 0.0014 |
| C | 0.0019 | 0.01 | 1.8 | 0.40 | 0.80 | 0.0014 | 0.0024 | 0.0017 | 0.0013 | 0.0016 |
| D | 0.0019 | 0.01 | 4.5 | 0.20 | 0.30 | 0.0017 | 0.0021 | 0.0019 | 0.0011 | 0.0012 |
| E | 0.0021 | 0.01 | 6.8 | 0.50 | 0.30 | 0.0017 | 0.0021 | 0.0019 | 0.0011 | 0.0012 |
| F | 0.0024 | 0.01 | 3.4 | 1.20 | 0.30 | 0.0019 | 0.0029 | 0.0024 | 0.0013 | 0.0016 |
| G | 0.0024 | 0.01 | 3.4 | 2.50 | 0.80 | 0.0019 | 0.0029 | 0.0024 | 0.0013 | 0.0016 |
| H | 0.0022 | 0.01 | 3.8 | 0.50 | 0.001 | 0.0019 | 0.0031 | 0.0028 | 0.0012 | 0.0011 |
| I | 0.0022 | 0.01 | 3.8 | 0.50 | 0.001 | 0.0019 | 0.0031 | 0.0028 | 0.0012 | 0.0011 |
| J | 0.0022 | 0.01 | 3.8 | 0.50 | 0.001 | 0.0019 | 0.0031 | 0.0028 | 0.0012 | 0.0008 |
| K | 0.0022 | 0.08 | 3.8 | 0.50 | 0.001 | 0.0019 | 0.0031 | 0.0028 | 0.0004 | 0.0011 |
| L | 0.0022 | 0.24 | 3.8 | 0.50 | 0.001 | 0.0019 | 0.0024 | 0.0023 | 0.0012 | 0.0011 |
| M | 0.0022 | 0.01 | 3.8 | 0.50 | 0.001 | 0.0019 | 0.0031 | 0.0028 | 0.0012 | 0.0011 |

TABLE 3-1-continued

| | C | P | Si | Mn | Al | S | N | O | Ti | Nb |
|---|---|---|---|---|---|---|---|---|---|---|
| N | 0.0022 | 0.01 | 3.0 | 0.50 | 0.001 | 0.0019 | 0.0021 | 0.0018 | 0.0008 | 0.0006 |
| O | 0.0019 | 0.01 | 3.4 | 0.20 | 1.40 | 0.0014 | 0.0024 | 0.0017 | 0.0013 | 0.0016 |
| P | 0.0019 | 0.01 | 3.35 | 0.20 | 1.50 | 0.0014 | 0.0024 | 0.0017 | 0.0013 | 0.0016 |
| Q | 0.0019 | 0.01 | 2.9 | 0.40 | 3.60 | 0.0014 | 0.0024 | 0.0017 | 0.0013 | 0.0016 |
| R | 0.0022 | 0.01 | 3.5 | 0.50 | 0.001 | 0.0019 | 0.0059 | 0.0028 | 0.0012 | 0.0011 |
| S | 0.0022 | 0.01 | 3.5 | 0.50 | 0.001 | 0.0019 | 0.0018 | 0.0064 | 0.0012 | 0.0011 |
| T | 0.0022 | 0.01 | 3.5 | 0.50 | 0.001 | 0.0019 | 0.0018 | 0.0021 | 0.0045 | 0.0011 |
| U | 0.0022 | 0.01 | 3.5 | 0.50 | 0.001 | 0.0019 | 0.0018 | 0.0023 | 0.0012 | 0.0057 |
| V | 0.0022 | 0.01 | 3.5 | 0.50 | 0.001 | 0.0019 | 0.0018 | 0.0023 | 0.0012 | 0.0014 |
| W | 0.0024 | 0.01 | 3.6 | 0.60 | 0.65 | 0.0018 | 0.0022 | 0.0025 | 0.0011 | 0.0011 |
| X | 0.0019 | 0.01 | 3.4 | 0.60 | 0.65 | 0.0021 | 0.0024 | 0.0024 | 0.0010 | 0.0010 |
| Y | 0.0027 | 0.01 | 3.7 | 0.50 | 0.65 | 0.0017 | 0.0023 | 0.0021 | 0.0009 | 0.0009 |
| Z | 0.0015 | 0.01 | 3.5 | 0.40 | 0.65 | 0.0018 | 0.0021 | 0.0024 | 0.0012 | 0.0013 |

| Steel symbol | Chemical composition (mass %) | | | | Si—2Al—Mn | Remarks |
|---|---|---|---|---|---|---|
| | V | Sn | Sb | Others | | |
| A | 0.0011 | 0.001 | 0.001 | — | 1.3 | Invention steel |
| B | 0.0007 | 0.04 | 0.001 | — | 2.1 | Invention steel |
| C | 0.0011 | 0.001 | 0.001 | — | −0.2 | Comparative steel |
| D | 0.0009 | 0.001 | 0.001 | — | 3.7 | Invention steel |
| E | 0.0009 | 0.001 | 0.001 | — | 5.7 | Comparative steel |
| F | 0.0011 | 0.001 | 0.001 | — | 1.6 | Invention steel |
| G | 0.0011 | 0.001 | 0.001 | — | −0.7 | Comparative steel |
| H | 0.0008 | 0.001 | 0.001 | — | 3.3 | Invention steel |
| I | 0.0008 | 0.10 | 0.001 | — | 3.3 | Invention steel |
| J | 0.0008 | 0.001 | 0.05 | — | 3.3 | Invention steel |
| K | 0.0008 | 0.001 | 0.001 | — | 3.3 | Comparative steel |
| L | 0.0008 | 0.001 | 0.001 | — | 3.3 | Invention steel |
| M | 0.0008 | 0.001 | 0.001 | Ca: 0.003 | 3.3 | Invention steel |
| N | 0.0008 | 0.001 | 0.001 | Mg: 0.002 | 2.5 | Invention steel |
| O | 0.0011 | 0.001 | 0.001 | — | 0.4 | Invention steel |
| P | 0.0011 | 0.001 | 0.001 | — | 0.2 | Invention steel |
| Q | 0.0011 | 0.001 | 0.001 | — | −4.7 | Comparative steel |
| R | 0.0008 | 0.001 | 0.001 | — | 3.0 | Comparative steel |
| S | 0.0008 | 0.001 | 0.001 | — | 3.0 | Comparative steel |
| T | 0.0008 | 0.001 | 0.001 | — | 3.0 | Comparative steel |
| U | 0.0008 | 0.001 | 0.001 | — | 3.0 | Comparative steel |
| V | 0.0062 | 0.001 | 0.001 | — | 3.0 | Comparative steel |
| W | 0.0008 | 0.001 | 0.001 | W: 0.0027 | 1.7 | Invention steel |
| X | 0.0007 | 0.001 | 0.001 | W: 0.0058 | 1.5 | Invention steel |
| Y | 0.0014 | 0.001 | 0.001 | Mo: 0.0035 | 1.9 | Invention steel |
| Z | 0.0012 | 0.001 | 0.001 | W: 0.0049, Mo: 0.0028 | 1.8 | Invention steel |

TABLE 3-2

| Steel symbol | Chemical Composition (mass %) | | | | | | | | | |
|---|---|---|---|---|---|---|---|---|---|---|
| | C | P | Si | Mn | Al | S | N | O | Ti | Nb |
| AA | 0.0021 | 0.01 | 3.6 | 0.50 | 0.60 | 0.0019 | 0.0020 | 0.0024 | 0.0013 | 0.0013 |
| AB | 0.0023 | 0.01 | 3.5 | 0.60 | 0.90 | 0.0016 | 0.0021 | 0.0024 | 0.0012 | 0.0013 |
| AC | 0.0021 | 0.01 | 3.5 | 0.60 | 0.90 | 0.0018 | 0.0024 | 0.0021 | 0.0012 | 0.0011 |
| AD | 0.0024 | 0.01 | 3.5 | 0.60 | 0.90 | 0.0018 | 0.0021 | 0.0024 | 0.0012 | 0.0013 |
| AE | 0.0025 | 0.01 | 3.5 | 0.60 | 0.90 | 0.0017 | 0.0019 | 0.0019 | 0.0012 | 0.0009 |
| AF | 0.0019 | 0.01 | 3.5 | 0.60 | 0.90 | 0.0018 | 0.0021 | 0.0017 | 0.0012 | 0.0013 |
| AG | 0.0023 | 0.007 | 3.5 | 0.60 | 0.90 | 0.0014 | 0.0021 | 0.0024 | 0.0012 | 0.0013 |
| AH | 0.0023 | 0.007 | 3.4 | 0.60 | 0.90 | 0.0018 | 0.0021 | 0.0024 | 0.0012 | 0.0013 |
| BA | 0.0022 | 0.01 | 3.6 | 0.40 | 0.60 | 0.0021 | 0.0018 | 0.0024 | 0.0013 | 0.0014 |
| BB | 0.0023 | 0.01 | 3.4 | 0.40 | 1.00 | 0.0016 | 0.0021 | 0.0024 | 0.0012 | 0.0013 |
| BC | 0.0021 | 0.01 | 3.5 | 0.60 | 0.70 | 0.0018 | 0.0024 | 0.0021 | 0.0012 | 0.0011 |

| Steel symbol | Chemical Composition (mass %) | | | | Si—2Al—Mn | Remarks |
|---|---|---|---|---|---|---|
| | V | Sn | Sb | Others | | |
| AA | 0.0012 | 0.03 | 0.001 | Cu: 0.3 | 1.9 | Invention steel |
| AB | 0.0009 | 0.04 | 0.001 | Ni: 0.2 | 1.1 | Invention steel |
| AC | 0.0012 | 0.04 | 0.001 | Cr: 0.5 | 1.1 | Invention steel |
| AD | 0.0012 | 0.04 | 0.001 | Cu: 0.2, Cr: 0.3 | 1.1 | Invention steel |
| AE | 0.0013 | 0.04 | 0.001 | Cu: 0.2, Ni: 0.1 | 1.1 | Invention steel |
| AF | 0.0011 | 0.04 | 0.001 | Ni: 0.1, Cr: 0.4 | 1.1 | Invention steel |
| AG | 0.0012 | 0.04 | 0.001 | Cu: 0.1, Ni: 0.1, Cr: 0.2 | 1.1 | Invention steel |
| AH | 0.0012 | 0.04 | 0.001 | | 1.0 | Invention steel |

TABLE 3-2-continued

| | | | | | | |
|---|---|---|---|---|---|---|
| BA | 0.0011 | 0.03 | 0.001 | Cu: 0.02, Ni: 0.03 | 2.0 | Invention steel |
| BB | 0.0009 | 0.03 | 0.001 | Ni: 0.05, Cr: 0.05 | 1.0 | Invention steel |
| BC | 0.0012 | 0.03 | 0.001 | Cu: 0.5, Cr: 0.6 | 1.5 | Comparative steel |

TABLE 4-1

| | | | Rolling conditions in final cold rolling | | | | | |
|---|---|---|---|---|---|---|---|---|
| Steel sheet No. | Steel symbol | Sheet thickness (mm) | Average rolling speed (m/min) | Total reduction rate $R_t$ (%) | Reduction rate $R_s$ in final pass (%) | Friction coefficient in final pass (—) | $R_s/R_t$ | Finish annealing temperature (° C.) |
| 1 | A | 0.25 | 1000 | 87.5 | 25 | 0.03 | 0.29 | 790 |
| 2 | A | 0.25 | 80 | 87.5 | 25 | 0.03 | 0.29 | 790 |
| 3 | A | 0.25 | 500 | 87.5 | 50 | 0.03 | 0.57 | 790 |
| 4 | A | 0.25 | 500 | 87.5 | 10 | 0.03 | 0.11 | 780 |
| 5 | A | 0.25 | 500 | 87.5 | 24 | 0.20 | 0.27 | 780 |
| 6 | A | 0.25 | 600 | 87.5 | 25 | 0.03 | 0.29 | 740 |
| 7 | A | 0.15 | 550 | 92.5 | 35 | 0.03 | 0.38 | 760 |
| 8 | A | 0.30 | 650 | 85.0 | 21 | 0.03 | 0.25 | 760 |
| 9 | A | 0.35 | 700 | 82.5 | 20 | 0.03 | 0.24 | 720 |
| 10 | B | 0.20 | 500 | 90.0 | 32 | 0.03 | 0.36 | 750 |
| 11 | B | 0.25 | 600 | 87.5 | 28 | 0.03 | 0.32 | 750 |
| 12 | B | 0.25 | 600 | 87.5 | 14 | 0.03 | 0.16 | 770 |
| 13 | B | 0.25 | 600 | 87.5 | 38 | 0.03 | 0.43 | 750 |
| 14 | C | 0.25 | 400 | 87.5 | 25 | 0.03 | 0.29 | 740 |
| 15 | D | 0.20 | 400 | 90.0 | 28 | 0.03 | 0.31 | 780 |
| 16 | F | 0.25 | 700 | 87.5 | 24 | 0.03 | 0.27 | 790 |
| 17 | H | 0.20 | 650 | 90.0 | 26 | 0.03 | 0.29 | 730 |
| 18 | I | 0.20 | 500 | 90.0 | 26 | 0.03 | 0.29 | 750 |
| 19 | J | 0.20 | 500 | 90.0 | 26 | 0.03 | 0.29 | 750 |
| 20 | K | 0.20 | 500 | 90.0 | 26 | 0.03 | 0.29 | 790 |
| 21 | M | 0.20 | 500 | 90.0 | 26 | 0.03 | 0.29 | 790 |
| 22 | N | 0.20 | 500 | 90.0 | 26 | 0.03 | 0.29 | 790 |
| 23 | O | 0.25 | 700 | 87.5 | 28 | 0.03 | 0.32 | 770 |

| | Steel sheet properties after finish annealing | | | | | | |
|---|---|---|---|---|---|---|---|
| Steel sheet No. | Area ratio of recrystallization (%) | Average grain size of recrystallized grains (μm) | Yield stress (MPa) | Average magnetostriction value $\lambda_{p-p}(\times 10^{-6})$ | 9 + 62*t | Iron loss $W_{10/400}$ (W/kg) | Remarks |
| 1 | 96 | 50 | 450 | 3.4 | 24.5 | 22.5 | Comparative Example |
| 2 | 35 | 25 | 530 | 8.4 | 24.5 | 34.9 | Comparative Example |
| 3 | 97 | 51 | 445 | 3.2 | 24.5 | 22.4 | Comparative Example |
| 4 | 38 | 21 | 535 | 8.9 | 24.5 | 35.9 | Comparative Example |
| 5 | 98 | 55 | 440 | 3.7 | 24.5 | 22.9 | Comparative Example |
| 6 | 70 | 20 | 520 | 2.5 | 24.5 | 19.8 | Invention Example |
| 7 | 75 | 26 | 528 | 2.6 | 18.3 | 16.2 | Invention Example |
| 8 | 75 | 26 | 528 | 2.7 | 27.6 | 20.4 | Invention Example |
| 9 | 68 | 21 | 560 | 2.4 | 30.7 | 21.7 | Invention Example |
| 10 | 72 | 25 | 570 | 2.9 | 21.4 | 18.4 | Invention Example |
| 11 | 72 | 25 | 570 | 2.8 | 24.5 | 19.9 | Invention Example |
| 12 | 80 | 24 | 560 | 2.8 | 24.5 | 20.3 | Invention Example |
| 13 | 72 | 28 | 565 | 2.8 | 24.5 | 19.8 | Invention Example |
| 14 | 65 | 20 | 420 | 3.9 | 24.5 | 22.9 | Comparative Example |
| 15 | 80 | 28 | 630 | 2.7 | 21.4 | 17.5 | Invention Example |
| 16 | 85 | 25 | 580 | 3.1 | 24.5 | 19.4 | Invention Example |

TABLE 4-1-continued

| | | | | | | | |
|---|---|---|---|---|---|---|---|
| 17 | 64 | 24 | 535 | 3.7 | 21.4 | 19.1 | Invention Example |
| 18 | 72 | 30 | 570 | 2.0 | 21.4 | 16.9 | Invention Example |
| 19 | 72 | 30 | 570 | 1.9 | 21.4 | 16.7 | Invention Example |
| 20 | 85 | 35 | 555 | 2.1 | 21.4 | 17.2 | Invention Example |
| 21 | 85 | 35 | 555 | 1.8 | 21.4 | 16.6 | Invention Example |
| 22 | 85 | 35 | 555 | 2.0 | 21.4 | 16.9 | Invention Example |
| 23 | 78 | 32 | 565 | 1.9 | 24.5 | 16.7 | Invention Example |

*Steel sheets produced from steels E, G, L, and Q are not described because sheet breakage has been caused during cold rolling.

TABLE 4-2

| Steel sheet No. | Steel symbol | Sheet thickness t (mm) | Rolling conditions in final cold rolling ||||| Finish annealing temperature (° C.) |
|---|---|---|---|---|---|---|---|---|
| | | | Average rolling speed (m/min) | Total reduction rate $R_t$ (%) | Reduction rate $R_s$ in final pass (%) | Friction coefficient in final pass (—) | $R_s/R_t$ | |
| 24 | P | 0.25 | 700 | 87.5 | 28 | 0.03 | 0.32 | 770 |
| 25 | R | 0.30 | 750 | 85.0 | 22 | 0.03 | 0.26 | 750 |
| 26 | S | 0.30 | 700 | 85.0 | 22 | 0.03 | 0.26 | 750 |
| 27 | T | 0.30 | 700 | 85.0 | 22 | 0.03 | 0.26 | 750 |
| 28 | U | 0.30 | 700 | 85.0 | 22 | 0.03 | 0.26 | 750 |
| 29 | V | 0.30 | 700 | 85.0 | 22 | 0.03 | 0.26 | 750 |
| 30 | W | 0.25 | 600 | 87.5 | 25 | 0.03 | 0.29 | 760 |
| 31 | X | 0.25 | 600 | 87.5 | 25 | 0.03 | 0.29 | 760 |
| 32 | Y | 0.25 | 600 | 87.5 | 25 | 0.03 | 0.29 | 760 |
| 33 | Z | 0.25 | 600 | 87.5 | 25 | 0.03 | 0.29 | 760 |
| 34 | Z | 0.30 | 650 | 85.0 | 25 | 0.03 | 0.29 | 850 |
| 35 | Z | 0.30 | 650 | 85.0 | 25 | 0.03 | 0.29 | 650 |
| 36 | AA | 0.25 | 600 | 87.5 | 24 | 0.025 | 0.27 | 710 |
| 37 | AB | 0.25 | 600 | 87.5 | 24 | 0.025 | 0.27 | 710 |
| 38 | AC | 0.25 | 600 | 87.5 | 24 | 0.025 | 0.27 | 710 |
| 39 | AD | 0.25 | 600 | 87.5 | 24 | 0.025 | 0.27 | 710 |
| 40 | AE | 0.25 | 600 | 87.5 | 24 | 0.025 | 0.27 | 710 |
| 41 | AF | 0.25 | 600 | 87.5 | 24 | 0.025 | 0.27 | 710 |
| 42 | AG | 0.25 | 600 | 87.5 | 24 | 0.025 | 0.27 | 710 |
| 43 | AH | 0.25 | 600 | 87.5 | 24 | 0.025 | 0.27 | 710 |
| 44 | BA | 0.25 | 500 | 87.5 | 22 | 0.025 | 0.25 | 780 |
| 45 | BB | 0.25 | 500 | 87.5 | 22 | 0.025 | 0.25 | 780 |
| 46 | BC | 0.25 | 500 | 87.5 | 22 | 0.025 | 0.25 | 780 |

| Steel sheet No. | Steel sheet properties after finish annealing ||||||
|---|---|---|---|---|---|---|
| | Area ratio of recrystallization (%) | Average grain size of recrystallized grains (μm) | Yield stress (MPa) | Average magnetostriction value $\lambda_{p-p}(\times 10^{-6})$ | 9 + 62*t | Iron loss $W_{10/400}$ (W/kg) | Remarks |
| 24 | 78 | 32 | 565 | 2.0 | 24.5 | 16.9 | Invention Example |
| 25 | 72 | 30 | 510 | 7.2 | 27.6 | 32.4 | Comparative Example |
| 26 | 72 | 30 | 510 | 7.6 | 27.6 | 32.8 | Comparative Example |
| 27 | 72 | 30 | 510 | 7.9 | 27.6 | 33.6 | Comparative Example |
| 28 | 72 | 30 | 510 | 7.4 | 27.6 | 32.6 | Comparative Example |
| 29 | 72 | 30 | 510 | 7.2 | 27.6 | 32.4 | Comparative Example |
| 30 | 75 | 32 | 560 | 2.9 | 24.5 | 19.7 | Invention Example |
| 31 | 75 | 32 | 540 | 2.7 | 24.5 | 19.5 | Invention Example |
| 32 | 75 | 32 | 570 | 2.8 | 24.5 | 19.6 | Invention Example |
| 33 | 75 | 32 | 555 | 2.7 | 24.5 | 19.5 | Invention Example |

TABLE 4-2-continued

| | | | | | | |
|---|---|---|---|---|---|---|
| 34 | 100 | 60 | 465 | 3.5 | 27.6 | 25.3 | Comparative Example |
| 35 | 10 | 15 | 550 | 7.2 | 27.6 | 38.9 | Comparative Example |
| 36 | 50 | 22 | 540 | 2.8 | 24.5 | 16.8 | Invention Example |
| 37 | 50 | 22 | 570 | 2.7 | 24.5 | 16.3 | Invention Example |
| 38 | 50 | 22 | 570 | 2.7 | 24.5 | 16.2 | Invention Example |
| 39 | 50 | 22 | 570 | 2.7 | 24.5 | 16.1 | Invention Example |
| 40 | 50 | 22 | 570 | 2.7 | 24.5 | 16.1 | Invention Example |
| 41 | 50 | 22 | 570 | 2.7 | 24.5 | 16.0 | Invention Example |
| 42 | 50 | 22 | 570 | 2.7 | 24.5 | 15.9 | Invention Example |
| 43 | 50 | 22 | 550 | 2.8 | 24.5 | 16.9 | Invention Example |
| 44 | 80 | 29 | 555 | 2.6 | 24.5 | 17.1 | Invention Example |
| 45 | 80 | 29 | 555 | 2.9 | 24.5 | 17.2 | Invention Example |
| 46 | 80 | 29 | 555 | 2.7 | 24.5 | 27.6 | Comparative Example |

*Steel sheets produced from steels E, G, L, and Q are not described because sheet breakage has been caused during cold rolling.

Furthermore, the obtained steel sheets Nos. 6 to 11 are subjected to a stress relief annealing of 825° C.×1 hr ($N_2$ atmosphere) as in the stress relief annealing of the stator core, and thereafter the iron loss in the L+C directions is measured by an Epstein test and also an average crystal grain size observed at a section in the rolling direction is measured. The results are shown in Table 5. As seen from these results, both high strength and low iron loss can be achieved in the material according to the invention.

TABLE 5

| | | Steel sheet properties after stress relief annealing | |  |
|---|---|---|---|---|
| Steel sheet No. | Steel symbol | Average grain size of recrystallized grains (μm) | Iron loss $W_{10/400}$ (W/kg) | Remarks |
| 6 | A | 120 | 10.5 | Invention Example |
| 7 | A | 130 | 8.5 | Invention Example |
| 8 | A | 130 | 11.1 | Invention Example |
| 9 | A | 110 | 11.9 | Invention Example |
| 10 | B | 115 | 9.2 | Invention Example |
| 11 | B | 115 | 10.4 | Invention Example |

The invention claimed is:

1. A non-oriented electrical steel sheet having a chemical composition comprising C: not more than 0.005 mass %, Si: 2.8 to 6.5 mass %, Mn: 0.05 to 2.0 mass %, Al: not more than 3.0 mass %, P: not more than 0.20 mass %, S: not more than 0.005 mass %, N: not more than 0.005 mass %, Ti: not more than 0.003 mass %, V: not more than 0.005 mass %, and Nb: not more than 0.005 mass %, provided that Si, Mn and Al satisfy Si—2Al—Mn≥0, and the remainder being Fe and inevitable impurities, wherein
an average value of magnetostriction $\lambda_{p\text{-}p}$ (L) in a rolling direction and magnetostriction $\lambda_{p\text{-}p}$ (C) in a direction perpendicular to the rolling direction at a frequency of 400 Hz and a magnetic flux density of 1.0 T is not more than $4.5\times10^{-6}$ and an area ratio of recrystallized crystal grains at a section in the rolling direction of the steel sheet is 40 to 95% and an average grain size is 10 to 40 μm.

2. The non-oriented electrical steel sheet according to claim 1, which contains at least one group selected from the following groups A to D in addition to the above chemical composition:
Group A: 0.0020 to 0.10 mass % in total of one or two selected from Mo and W;
Group B: 0.005 to 0.20 mass % of one or two selected from Sn and Sb;
Group C: 0.001 to 0.010 mass % in total of one or two selected from Ca and Mg;
Group D: 0.01 to 1.0 mass % in total of one or more selected from Cu, Ni and Cr.

3. The non-oriented electrical steel sheet according to claim 1, wherein
a yield stress is not less than 500 MPa and a sheet thickness t mm and an iron loss $W_{10/400}$ W/kg satisfy the following equation (1):

$$W_{10/400} \leq 9 + 62 \times t \quad \ldots \quad (1)$$

where t is in the range of 0.1 to 0.35 mm.

4. The non-oriented electrical steel sheet according to claim 2, wherein
a yield stress is not less than 500 MPa and a sheet thickness t mm and an iron loss $W_{10/400}$ W/kg satisfy the following equation (1):

$$W_{10/400} \leq 9 + 62 \times t \quad \ldots \quad (1)$$

where t is in the range of 0.1 to 0.35 mm.

5. A method of producing the non-oriented electrical steel sheet according to claim 1, the method comprising:
hot rolling a steel slab having a chemical composition comprising C: not more than 0.005 mass %, Si: 2.8 to 6.5 mass %, Mn: 0.05 to 2.0 mass %, Al: not more than 3.0 mass %, P: not more than 0.20 mass %, S: not more than 0.005 mass %, N: not more than 0.005 mass %, Ti: not more than 0.003 mass %, V: not more than 0.005 mass %, and Nb: not more than 0.005 mass %, provided that Si, Mn and Al satisfy Si—2Al—Mn>0, and the remainder being Fe and inevitable impurities to form a hot-rolled sheet, subjecting the hot-rolled sheet to a hot-band annealing and then to a single cold rolling or two or more cold rollings having an intermediate annealing interposed therebetween to form a cold-rolled sheet having a final sheet thickness, and subjecting the cold-rolled sheet to a finish annealing, wherein an average rolling speed in a final cold rolling is 100 to 900 m/min; a friction coefficient in a final pass is 0.01 to 0.10; a ratio ($R_s/R_t$) of rolling reduction $R_s$ in the final pass (%) to a total rolling reduction $R_t$ (%) is 0.15 to 0.45; and a soaking temperature in the finish annealing falls within the range of 700 to 820° C.

6. The method for producing a non-oriented electrical steel sheet according to claim 4, wherein the steel slab contains at least one group selected from the following groups A to D in addition to the above chemical composition:

Group A: 0.0020 to 0.10 mass % in total of one or two selected from Mo and W;

Group B: 0.005 to 0.20 mass % of one or two selected from Sn and Sb;

Group C: 0.001 to 0.010 mass % in total of one or two selected from Ca and Mg;

Group D: 0.01 to 1.0 mass % in total of one or more selected from Cu, Ni and Cr.

7. A method for producing a motor core comprising a stator core and a rotor core, wherein an average crystal grain size of the rotor core is 10 to 40 μm, the method comprising:

laminating the non-oriented electrical steel sheet according to claim 1 having an average crystal grain size of 10 to 40 μm to form the stator core, subjecting the stator core to a stress relief annealing thereby to have an average crystal grain size of the stator core being not less than 80 μm.

8. A method for producing a motor core comprising a stator core and a rotor core, wherein an average crystal grain size of the rotor core is 10 to 40 μm, the method comprising:

laminating the non-oriented electrical steel sheet according to claim 2 having an average crystal grain size of 10 to 40 μm to form the stator core, subjecting the stator core to a stress relief annealing thereby to have an average crystal grain size of the stator core being not less than 80 μm.

9. A method for producing a motor core comprising a stator core and a rotor core, wherein an average crystal grain size of the rotor core is 10 to 40 μm, the method comprising:

laminating the non-oriented electrical steel sheet according to claim 3 having an average crystal grain size of 10 to 40 μm to form the stator core, subjecting the stator core to a stress relief annealing thereby to have an average crystal grain size of the stator core being not less than 80 μm.

10. A method for producing a motor core comprising a stator core and a rotor core, wherein an average crystal grain size of the rotor core is 10 to 40 μm, the method comprising:

laminating the non-oriented electrical steel sheet according to claim 4 having an average crystal grain size of 10 to 40 μm to form the stator core, subjecting the stator core to a stress relief annealing thereby to have an average crystal grain size of the stator core being not less than 80 μm.

* * * * *